United States Patent
Okida et al.

(10) Patent No.: US 9,776,251 B2
(45) Date of Patent: Oct. 3, 2017

(54) LATHE TURNING TOOL

(71) Applicants: SUMITOMO ELECTRIC HARDMETAL CORP., Itami-shi (JP); SUMITOMO ELECTRIC INDUSTRIES, LTD., Osaka-shi (JP); DMG MORI SEIKI CO., LTD., Yamatokoriyama-shi (JP)

(72) Inventors: Junya Okida, Itami (JP); Kazuya Ishikawa, Itami (JP); Shigenori Emoto, Itami (JP); Daisuke Murakami, Itami (JP); Shinya Ikenaga, Itami (JP); Kazuo Noguchi, Itami (JP); Suehiro Ikeda, Osaka (JP); Takayuki Hirokawa, Kyoto (JP); Yoshio Ohara, Kyoto (JP); Morihiro Hideta, Yamatokoriyama (JP); Yohei Oda, Yamatokoriyama (JP)

(73) Assignees: Sumitomo Electric Hardmetal Corp., Itami-shi (JP); Sumitomo Electric Industries, Ltd., Osaka-shi (JP); DMG MORI SEIKI CO., LTD., Yamatokoriyama-shi (JP)

( * ) Notice: Subject to any disclaimer, the term of this patent is extended or adjusted under 35 U.S.C. 154(b) by 212 days.

(21) Appl. No.: 14/420,583

(22) PCT Filed: Aug. 6, 2013

(86) PCT No.: PCT/JP2013/071209
§ 371 (c)(1),
(2) Date: Feb. 9, 2015

(87) PCT Pub. No.: WO2014/024862
PCT Pub. Date: Feb. 13, 2014

(65) Prior Publication Data
US 2015/0231702 A1     Aug. 20, 2015

(30) Foreign Application Priority Data

Aug. 10, 2012 (JP) .................................. 2012-177776

(51) Int. Cl.
B23B 27/00 (2006.01)
B23B 27/12 (2006.01)
B23B 27/16 (2006.01)

(52) U.S. Cl.
CPC .......... *B23B 27/12* (2013.01); *B23B 27/1622* (2013.01); *B23B 2200/0461* (2013.01);
(Continued)

(58) Field of Classification Search
CPC ....... B23B 27/16; B23B 27/007; B23B 27/02; B23B 51/06; B23C 5/10; B23C 5/28;
(Continued)

(56) References Cited

U.S. PATENT DOCUMENTS 2,383,958 A    9/1945   Vlieg
3,496,618 A *   2/1970   Como .................... B26D 1/00
                                                30/347
(Continued)

FOREIGN PATENT DOCUMENTS

CN       1829581 A    9/2006
EP       0599393 A1    6/1994
(Continued)

OTHER PUBLICATIONS

Notification of the First Office Action in Chinese Patent Application No. 201380042445, dated Dec. 1, 2015.
(Continued)

*Primary Examiner* — Will Fridie, Jr.
(74) *Attorney, Agent, or Firm* — Venable LLP; Michael A. Sartori; Miguel A. Lopez (57) ABSTRACT

A cutting insert is configured to include: a first portion having a rake face, a flank face, a cutting edge, and a face
(Continued)

facing an insert attachment portion at an end of a tool main body; and a second portion having a side surface including at least one flat plane that is parallel to a center line of a tool or inclined at a prescribed angle to the center line. The second portion extends continuously to a region surrounded by the face of the first portion. The second portion is fitted into the tool main body to position the cutting insert and to prevent the cutting insert from rotating.

9 Claims, 10 Drawing Sheets

(52) U.S. Cl.
CPC ..... *B23B 2200/128* (2013.01); *B23B 2205/12* (2013.01); *Y10T 407/14* (2015.01); *Y10T 407/1906* (2015.01)

(58) Field of Classification Search
CPC ........ B23C 2200/085; B23C 2200/086; B23C 2200/361
See application file for complete search history.

(56) References Cited

U.S. PATENT DOCUMENTS

| | | | |
|---|---|---|---|
| 5,026,224 A | | 6/1991 | Andersson et al. |
| 6,126,366 A * | | 10/2000 | Lundblad ............ B23B 27/1622 407/102 |
| 7,431,540 B2 * | | 10/2008 | Lof ...................... B23B 27/141 407/103 |
| 8,459,904 B2 * | | 6/2013 | de Souza Filho ...... B23B 27/12 407/103 |
| 8,790,049 B2 * | | 7/2014 | Chen .................... B23B 27/16 407/103 |
| 2003/0143044 A1 | | 7/2003 | Rothenstein |
| 2005/0019110 A1 | | 1/2005 | Astrakhan |
| 2005/0095076 A1 | | 5/2005 | Pantzar |
| 2006/0051167 A1 * | | 3/2006 | Massa .................... B23B 27/12 407/103 |
| 2009/0142150 A1 * | | 6/2009 | Chu ........................ B23C 5/10 408/59 |
| 2011/0013995 A1 | | 1/2011 | Hecht |
| 2011/0182680 A1 * | | 7/2011 | Cohen .................. B23B 27/007 407/102 |
| 2011/0214552 A1 * | | 9/2011 | Abe .................... B23B 27/1614 83/663 |
| 2011/0299945 A1 * | | 12/2011 | Choi .................... B23C 5/1036 407/11 |
| 2012/0087746 A1 * | | 4/2012 | Fang .................... B23B 27/007 407/11 |

FOREIGN PATENT DOCUMENTS

| | | |
|---|---|---|
| GB | 1473664 A | 5/1977 |
| GB | 2057939 A | 4/1981 |
| JP | 02-035616 U | 3/1990 |
| JP | H09155622 A | 6/1997 |
| JP | 2002144112 A | 5/2002 |
| JP | 2007-500083 A | 1/2007 |
| JP | 2007-504011 A | 3/2007 |
| JP | 2007-090496 A | 4/2007 |
| TW | 201221279 A | 6/2012 |
| WO | WO-2004/062840 A1 | 7/2004 |
| WO | WO-2005/009660 A1 | 2/2005 |
| WO | WO-2005/021191 A2 | 3/2005 |
| WO | WO-2010/035475 A1 | 4/2010 |
| WO | WO-2012/047456 A1 | 4/2012 |

OTHER PUBLICATIONS

Supplementary European Search Report in European Patent Application No. 13827272.9, dated Mar. 2, 2016.
Extended European Search Report in European Patent Application No. 13827272.9, dated Jun. 13, 2016.
International Search Report issued in PCT Application No. PCT/JP2013/071209 dated Sep. 3, 2013.

* cited by examiner

LATHE TURNING TOOL

TECHNICAL FIELD

The present invention relates to a lathe turning tool used in a processing scheme in which a tool main body is placed with respect to a processing machine in such a direction that the axial center of the main body crosses the rotation center of a workpiece, and a cutting insert attached to an end of the tool main body is caused to cut into the workpiece while being rotated together with the tool main body about the axial center of the tool.

BACKGROUND ART

There is a known lathe turning tool referred to as a rotary cutting tool, a spinning tool, and the like that is used in the above-mentioned processing scheme. An example of such a lathe turning tool is, for example, disclosed in Japanese Patent National Publication No. 2007-504011 as described below.

The lathe turning tool disclosed in this document has two structures for attachment of a cutting insert. One of the structures is as follows: a collet is inserted into a hole at the end of a tool holder (a tool main body), a portion of the collet protruding from the tool holder is inserted into an attachment hole in the center of the cutting insert, and this protruding portion is screwed into the collet through the attachment hole in the center of the cutting insert, to cause an increase in diameter by a bolt so as to be functioned as a so-called inner diameter chuck for fixing the cutting insert.

The cutting insert is provided on its bottom surface (seat face) with a protrusion, which is fitted into a concave portion provided in the bearing surface at the end of the tool holder, so that this cutting insert is prevented from rotating.

The other one of the attachment structures is as follows: a cutting insert is provided with an attachment portion having a truncated conical shape, and this attachment portion is inserted into a fitting bore provided at the end of the tool main body (a tool holder) for fixing the cutting insert.

CITATION LIST

Patent Document

PTD 1: Japanese Patent National Publication No. 2007-504011

SUMMARY OF INVENTION

Technical Problem

According to the former type of the lathe turning tool using a collet among the lathe turning tools disclosed in PTD 1 mentioned above, since the insert hole portion is fixed by means of lining, the clamping force of the insert cannot be sufficiently ensured, which may readily cause a situation where the insert is damaged during processing, and a situation where the entire collet or holder is damaged. Furthermore, the number of components is increased due to use of a collet, which is disadvantageous in terms of cost.

Furthermore, according to the latter type of the lathe turning tool, the attachment portion having a truncated conical shape and provided in the cutting insert is press-fitted into the fitting bore at the end of the tool main body. In this case, if the press-fitting force is too weak, the cutting insert slips due to a circular fitting configuration, so that processing cannot be carried out. In the case where the press-fitting force is too strong, the force to push open the wall around the fitting bore is exerted on the tool main body, so that the holder may be deformed or damaged. Even in the case where the holder itself is not damaged, the force tends to occur due to the shape of pincers in the direction in which the insert comes off. Thus, excessive force is exerted on the clamp screw fixing the insert, so that the screw tends to be readily damaged and the insert tends to readily come off.

The present invention aims to provide a lathe turning tool used in the above-mentioned processing scheme and configured to allow a cutting insert to be held in the tool main body so as not to be applied with excessive force without using clamping force and a collet that is disadvantageous in terms of cost, thereby allowing lengthened life of the tool main body.

Solution to Problem

In order to solve the above-described problems, the present invention provides a lathe turning tool including: a tool main body; and a cutting insert attached to an insert attachment portion at an end of the tool main body. The lathe turning tool serves to process a workpiece with a cutting edge of the cutting insert while rotating the tool main body and the cutting insert about a center line of the tool as an axis. The cutting edge extends continuously in a tool rotating direction. The lathe turning tool is configured as described below.

Specifically, the cutting insert is configured to include a first portion related to cutting and a second portion used for positioning. The first portion has a rake face disposed at the end of the tool, a flank face disposed on an outer circumference of the tool, a cutting edge having a circular shape or an approximately circular shape as seen from an axial end face, and a face facing the insert attachment portion at the end of the tool main body. The second portion has a side surface formed by at least one flat plane that is parallel to the center line of the tool or inclined at a prescribed angle to the center line of the tool.

Furthermore, the second portion extends continuously to a region surrounded by the face of the first portion that faces the insert attachment portion at the end of the tool main body, and this second portion is fitted into the tool main body to position the cutting insert and to prevent the cutting insert from rotating.

The "cutting edge having . . . an approximately circular shape" used herein means a polygonal shape having eight or more corners, a shape obtained by rounding off the corners of a basic polygonal shape having eight or more corners, a shape of a cutting edge continuously extending in an endless manner while regularly undulating in the radial direction, a circular shape from which a part is cut out, or the like.

Preferable embodiments of the lathe turning tool as described above will be hereinafter listed.

(1) A concave portion into which the second portion of the cutting insert is fitted is provided by providing an opening at the end of the tool main body. The concave portion has a restraining surface provided to correspond to each side surface of the second portion. The restraining surface has a width narrower than a width of the side surface of the second portion. The side surface of the second portion comes into contact with one end of the restraining surface when the second portion rotates within the concave portion.

(2) The tool main body is provided with a supporting surface extending continuously in a circumferential direction and perpendicularly to an axis around a portion fitted to the second portion of the cutting insert such that the supporting surface supports a face of the cutting insert that faces the insert attachment portion at the end of the tool main body.

(3) The cutting insert is provided in a center portion with an attachment hole through which a clamp screw passes, and further provided in the rake face with a plurality of grooves extending in a radial manner from an inner surface of the attachment hole in a radially outward direction. A flow path of a fluid is formed by each of the grooves between the clamp screw passing through the attachment hole and the cutting insert. A gap allowing communication between the flow path and a fluid channel formed inside the tool main body is provided between the tool main body and the cutting insert.

(4) Assuming that an axial dimension of the second portion of the cutting insert is defined as L, the axial dimension of the first portion is set to fall within a range of 0.8 L to 1.3 L.

The present invention also provides a cutting insert as set forth below. The cutting insert includes the first portion related to cutting and the second portion used for positioning. The first portion has the rake face disposed at the end of the tool, the flank face disposed on the outer circumference of the tool, the cutting edge having a circular shape or an approximately circular shape as seen from an axial end face, and the face received and supported by the insert attachment portion at the end of the tool main body. The second portion has a regular polygonal cross section perpendicular to an axis, and has a side surface parallel to the center line of the tool.

According to the cutting insert used for the lathe turning tool of the present invention, the cutting edge may have a preferable shape as seen from the axial end face including any one of: a polygonal shape having eight or more corners; a shape obtained by rounding off corners of a basic polygonal shape having eight or more corners; and a circular shape in which a concave portion is partially formed.

Advantageous Effects of Invention

According to the lathe turning tool of the present invention, the cutting insert is provided with the first portion that can be supported in the axial direction, and the second portion of the cutting insert is fitted into the tool main body on the rear side of the tool with respect to the first portion to prevent rotation of the cutting insert for keeping the position thereof, so that the cutting insert can be stably held without using a collet and the like. Furthermore, according to the processing method described above, although frictional force resulting from chips is exerted on the rake face of the cutting insert due to rotation of the tool, this frictional force acts in the direction in which the cutting insert is caused to rotate, and therefore, this force and the support obtained by the fitted state allow the insert to be further stably clamped during processing.

Furthermore, the face formed in the first portion and the protruding end of the second portion are received by the insert attachment portion of the tool main body, and thereby, the cutting force in the axial direction that is exerted on the cutting insert can be received. This leads to a decrease in the force exerted on the insert attachment portion of the tool main body in the radially outward direction so as to push open the insert attachment portion. Consequently, fatigue and damage caused on the tool main body are suppressed, thereby allowing lengthened life of the tool main body. In addition, damage on the clamp screw and removal of the insert are also suppressed, so that processing troubles can be prevented.

DESCRIPTION OF EMBODIMENTS

Figure 1:
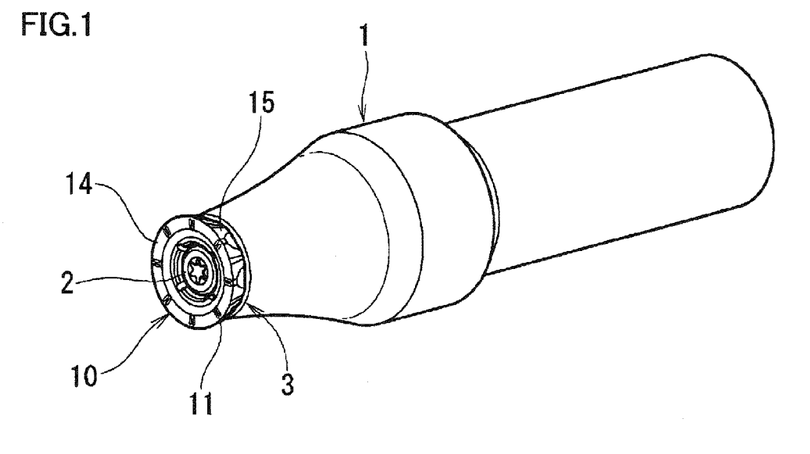
FIG. 1 is a perspective view showing an example of a lathe turning tool according to the present invention.
Figure 2:
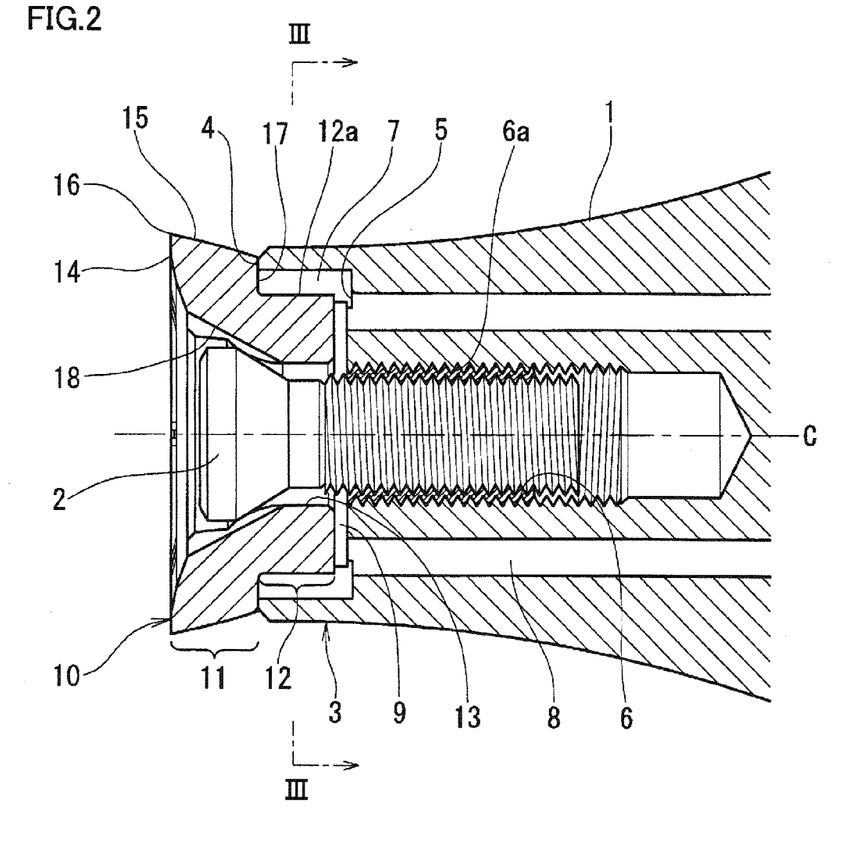
FIG. 2 is a cross-sectional view on the end side of the lathe turning tool in FIG. 1.

Embodiments of a lathe turning tool according to the present invention will be hereinafter described with reference to FIGS. 1 to 9 in the accompanying drawings. As shown in FIGS. 1 and 2, a lathe turning tool according to the present invention includes a tool main body 1, a cutting insert 10, and a clamp screw 2 fixing cutting insert 10 to tool main body 1.

Tool main body 1 is provided at its end with an insert attachment portion 3 having a bearing surface (see FIG. 7) perpendicular to the axis (at a right angle to the axial center of the tool). In addition to bearing surface 4, insert attachment portion 3 includes: a concave portion 5 that is opened at the front face of tool main body 1 and has a noncircular cross section perpendicular to the axis; and a screw hole 6 into which clamp screw 2 is screwed (6a indicates a reinforcing member for a screw hole provided as required). Cutting insert 10 is received and supported at this bearing surface 4.

Bearing surface 4 extends continuously in the circumferential direction, and can stably support cutting insert 10 in an entire region on the outer circumference of clamp screw 2.

Concave portion 5 has a flat restraining surface 5a. Concave portion 5 of the tool shown in the figure is formed in a square shape as a basic shape and has a relatively large relief portion 7 in each corner portion. Accordingly, two parallel restraining surfaces 5a and 5a arranged to face each other are defined as one pair, in which case two pairs of restraining surfaces exist that are turned by 90° relative to each other.

Figure 3:
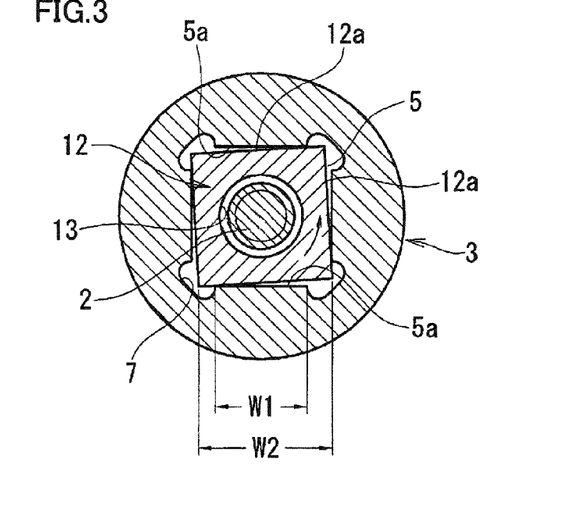
FIG. 3 is a cross-sectional view taken along a line III-III in FIG. 2.
Figure 4:
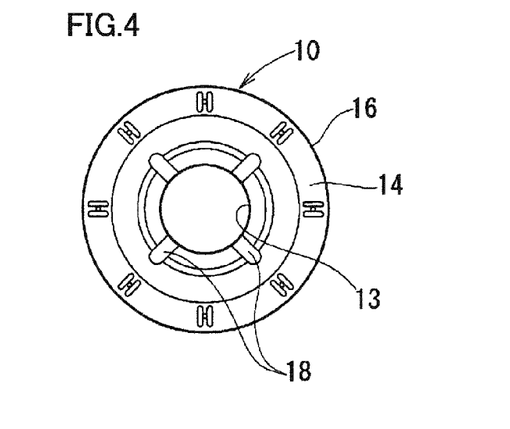
FIG. 4 is a plan view showing an example of a cutting insert.
Figure 5:
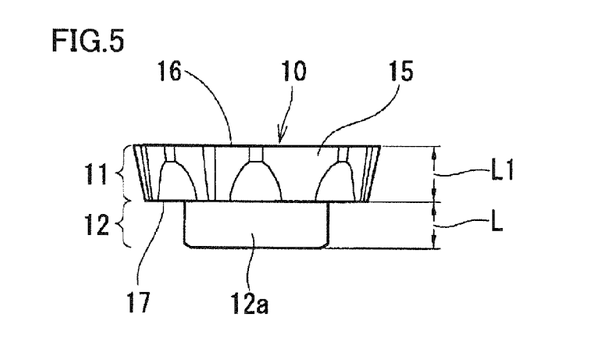
FIG. 5 is a side view of the cutting insert in FIG. 4.
Figure 6:
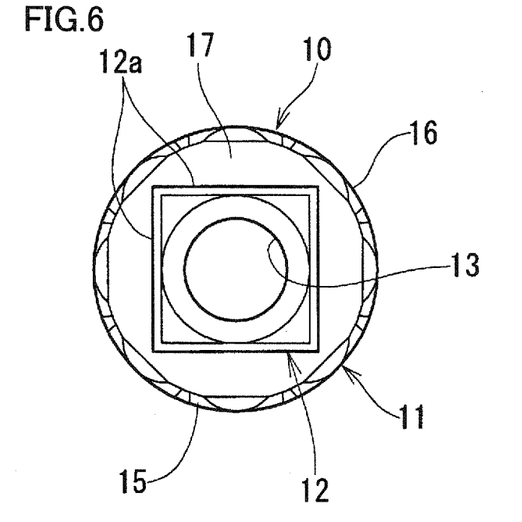
FIG. 6 is a bottom view of the cutting insert in FIG. 4.

It is preferable that a width w1 of restraining surface 5a shown in FIG. 3 is narrower than a width w2 of a side surface 12a of the second portion in cutting insert 10 which will be described later (that satisfies the condition of w1<w2). This preferable configuration is employed in the exemplified tool.

Cutting insert 10 shown in the figures (simultaneously referring to FIGS. 4 to 6) is formed of a first portion 11 related to cutting and a second portion 12 used for positioning, and has an attachment hole 13 passing through its center.

First portion 11 has: a rake face 14 disposed at the end of the tool; a flank face 15 disposed on the outer circumference of the tool; a cutting edge 16 extending continuously in the circumferential direction; and a face 17 supported by bearing surface 4 provided in insert attachment portion 3 of the tool main body.

Rake face 14 is provided with a plurality of grooves 18 as required that extend in a radial manner from the inner surface of attachment hole 13 in the radially outward direction. The purpose of providing these grooves 18 will be described later.

Second portion 12 has a base end extending integrally continuous to first portion 11 at the position surrounded by face 17. Second portion 12 has a cross section perpendicular to the axis that is shaped to correspond to the shape of concave portion 5 (the tool shown in the figure has a square shape). This second portion 12 is inserted into concave portion 5.

In this state, face 17 is received and supported by bearing surface 4 at the end of the tool main body, and clamp screw 2 passing through attachment hole 13 is fastened, thereby fixing cutting insert 10 to tool main body 1. In this case, the bottom surface (the protruding end of second portion 12) of cutting insert 10 floats from the bottom of concave portion 5. Accordingly, bearing surface 4 and face 17 come in close contact with each other with reliability, so that the cutting insert is supported with stability.

Bearing surface 4 and face 17 that is received and supported thereby are shaped to continuously surround the outer circumference of clamp screw 2. Thereby, cutting insert 10 is supported in the entire area on the outer circumference of clamp screw 2. According to the processing method that is performed while rotating the tool described above, the processing point provided by the cutting edge of the insert is to move on the circumference. Furthermore, the supporting surface may be discontinuous for the purpose of providing a passage for cooling the insert. However, depending on the processing load, the support performance may become unstable when the processing point corresponds to such a discontinuous portion. Accordingly, the balance of supporting the cutting insert by the tool main body is stabilized more in the configuration in which the supporting surface is continuously formed.

Furthermore, second portion 12 of cutting insert 10 has side surface 12a formed so as to be parallel to the center line of the tool. Accordingly, when second portion 12 is inserted into concave portion 5 provided in tool main body 1, the wall around concave portion 5 is less likely to receive the force (press-fitting force) that diametrically expands this wall.

Figure 7:
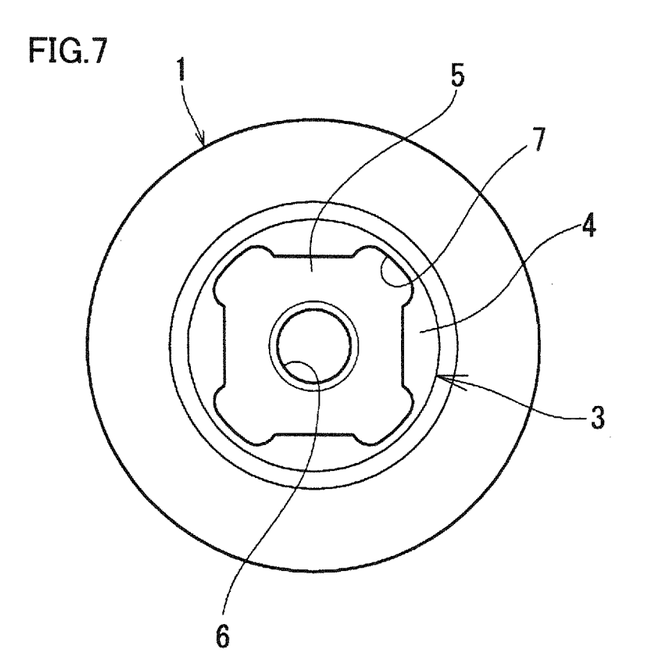
FIG. 7 is an end view of the end of a tool main body.

Side surface 12a has width w2 that is almost equal to the length of each side of concave portion 5 (strictly, that is smaller by an amount corresponding to a fitting gap that is to be produced). Since relief portion 7 is formed in a vertex portion of concave portion 5, the preferable condition of w1<w2 is satisfied. By defining relief portion 7 to be relatively large, the above-mentioned condition can be satisfied, for example, also in the case where the ridge is beveled in order to increase the strength in the side surface of the second portion of the insert. On the other hand, for example, if relief portion 7 is formed in a circular shape so as to be enlarged, the minimum width of bearing surface 4 becomes too narrow or bearing surface 4 discontinuously extends in the circumferential direction, with the result that the seating may become unstable. Therefore, it is desirable that relief portion 7 is formed not to be a true circle but to be a shape extending slightly in the circumferential tangential direction as shown in FIGS. 3 and 7.

Cutting insert 10 is prevented from rotating by the method of restraining side surface 12a by restraining surface 5a. In this case, as shown in FIG. 3, if width w1 of restraining surface 5a is smaller than width w2 of side surface 12a, both ends of restraining surface 5a in the width direction are to come into contact with side surface 12a, thereby receiving cutting insert 10 and preventing this cutting insert 10 from rotating.

Accordingly, each corner portion of second portion 12 in cutting insert 10 that is made of a high hardness material represented by cemented carbide or cement is prevented from coming into contact with and digging into restraining surface 5a of tool main body 1 made of tool steel or the like that is lower in hardness than the cutting insert. Consequently, the life of tool main body 1 is further lengthened.

The exemplified lathe turning tool configured as described above is used as shown in FIG. 9 such that tool main body 1 is placed with respect to a processing machine (not shown) in the direction in which the axial center of this tool main body 1 crosses the rotation center of a workpiece W, and cutting insert 10 attached to the end of this tool main body 1 is caused to cut into rotating workpiece W while being rotated together with tool main body 1 about the axial center of the tool.

According to the processing performed in this scheme, relatively large cutting force is exerted on cutting insert 10 in the direction in which the tool is bent. Since the lathe turning tool of the present invention receives this force while supporting the side surface of the second portion of the cutting insert, the axial dimension of the second portion becomes important.

Assuming that the axial dimension of second portion 12 is defined as L, it is appropriate that the axial dimension of first portion 11 (L1 in FIG. 5) falls within a range of 0.8 L to 1.3 L. When this dimension L1 is set at 1.3 L or less, the axial length of the second portion can be sufficiently ensured, so that clamping of the insert can sufficiently withstand the above-described force exerted in the direction in which the tool is bent. On the other hand, dimension L1 is set at 0.8 L or more, thereby preventing the axial length of the second portion from becoming unnecessarily long. Consequently, the parallelism of side surface 12a of the second portion with the tool axis does not degrade, so that the fitting gap between the second portion of the insert and the concave portion of the tool main body can be set relatively small. Therefore, clamping of the insert can be further stabilized.

Then, the function of grooves 18 mentioned above will be described. Since the lathe turning tool of the present invention is used for rough processing that causes a relatively large load, it is effective to use a coolant for lengthening the life of the tool.

Thus, according to the exemplified tool, as shown in FIG. 2, rake face 14 of cutting insert 10 is provided with a plurality of grooves 18 that extend in a radial manner from the inner surface of the center attachment hole 13 in the radially outward direction, and a flow path of the fluid is provided by each of these grooves 18 between clamp screw 2 passing through attachment hole 13 and cutting insert 10.

Also, a gap 9 that allows communication between the flow path and a fluid channel 8 formed within tool main body 1 is provided between tool main body 1 and cutting insert 10, so that the coolant supplied through fluid channel 8 can be guided through groove 18 to flow into the cutting portion.

Since stress tends to readily concentrate in each groove 18, it is preferable that each groove 18 is provided at a position that is in phase with the corner portion on the outer circumference of the second portion where the thickness in the radial direction is greater than those in other portions.

In addition, according to the exemplified cutting tool, bearing surface 4 formed at the end of tool main body 1 supports face 17 formed in the first portion of cutting insert 10 to thereby receive the cutting force in the axial direction that is exerted on the tool, but the cutting force in the axial direction can be received by a structure in which the bottom surface of cutting insert 10 (the protruding end of second portion 12) is pressed against the bottom surface of concave portion 5; or a structure employing a combination of the state where face 17 is supported by bearing surface 4 and the state where the protruding end of second portion 12 in the cutting insert is supported by the bottom surface of concave portion 5.

However, in the case of the above-described combined use of the supported states, the distance between face 17 of the insert and the bottom surface needs to be identical to the depth of the concave portion in the holder main body, which requires both to have sufficient shape accuracy. Furthermore, the distance between the supporting surface and the processing point is closer in the case of the support by face 17 as with the exemplified tool than in the case of the support by the bottom surface of the insert, and the clamped state of the insert becomes stable. Accordingly, it is preferable that the cutting force in the axial direction that is exerted on the tool is received only by bearing surface 4 supporting face 17 formed in the first portion. In addition, the processing performed in this scheme shows a characteristic that the thrust force included in the cutting force that is exerted in the direction perpendicular to the axial direction of the tool tends to readily increase. The thrust force exerted on the insert is supported by both of the clamp screw and the contact between side surface 12a and the tool main body. In this case, this force can be vertically received when side surface 12a extends parallel to a center line C of the tool. Accordingly, the load applied to the clamp screw can be reduced, thereby achieving an effect of preventing occurrence of troubles such as damage to the clamp screw and removal of the insert. Therefore, it is preferable that side surface 12a is provided so as to be parallel to center line C of the tool in the case of the processing condition that causes a particularly large load.

Figure 8:
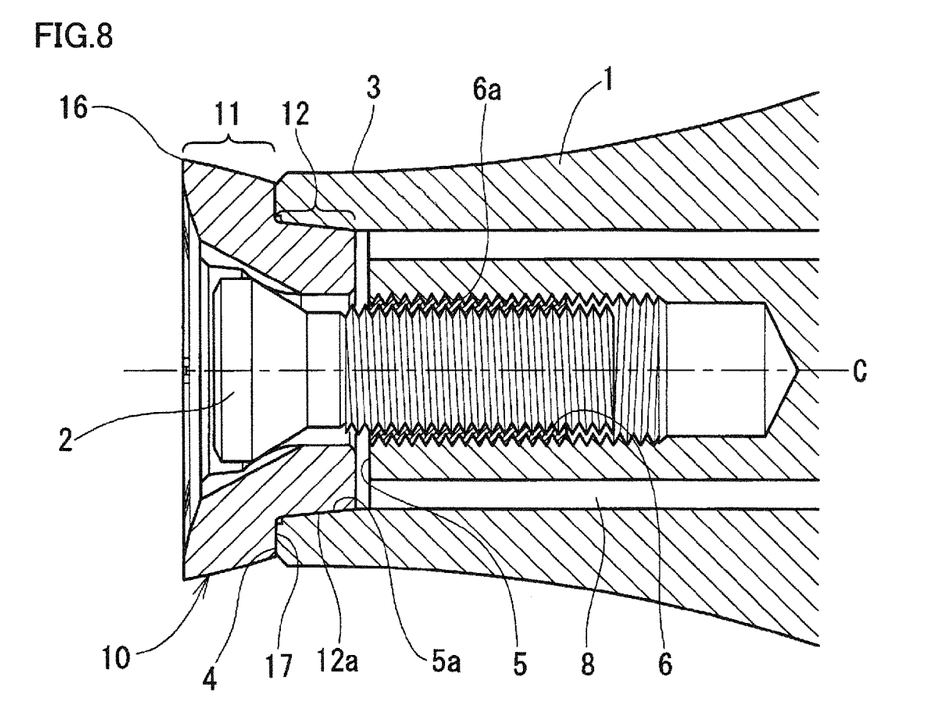
FIG. 8 is a diagram showing a modification of the second portion of the cutting insert and a concave portion provided in the tool main body.
Figure 9:
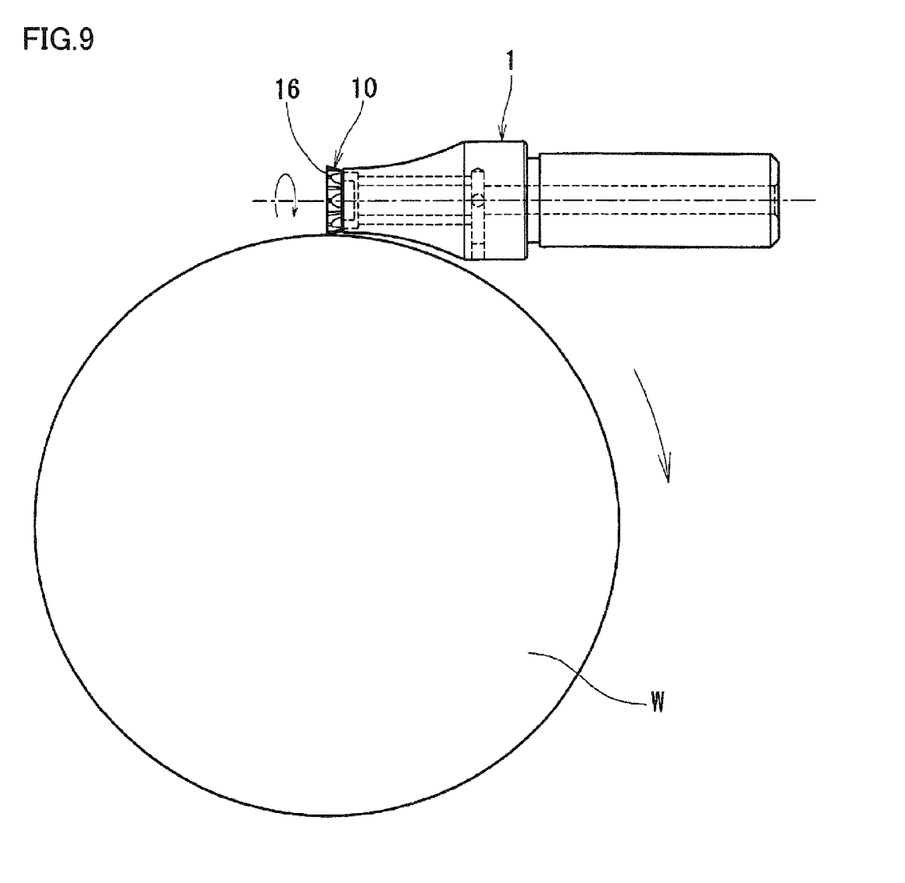
FIG. 9 is a diagram illustrating a method of using the lathe turning tool according to the present invention.

Furthermore, restraining surface 5a of concave portion 5 provided in the tool main body and side surface 12a of the second portion in the cutting insert each are parallel to center line C of the tool in FIGS. 1 to 3, but may be inclined at a prescribed angle to center line C of the tool as shown in FIG. 8 in the case of the condition that causes a relatively small processing load.

When these concave portion 5 and second portion 12 are formed so as to be non-circularly fitted into each other, the purpose of preventing rotation of the cutting insert can be achieved. Accordingly, though not particularly limited about a cross-sectional shape perpendicular to the axis, if the fitting portion has a regular polygonal cross section perpendicular to the axis, cutting insert 10 can be attached to tool main body 1 at a portion where side surface 12a of the second portion in the cutting insert faces restraining surface 5a located at any position. Furthermore, since the restrained state shows an axial symmetry, stabilized clamping can be achieved.

The cutting insert having a diameter of about φ8 mm to about φ30 mm is generally frequently used, and thus, it is considered that cutting insert 10 employed for the tool of the present invention is also sized to that extent.

Figure 10:
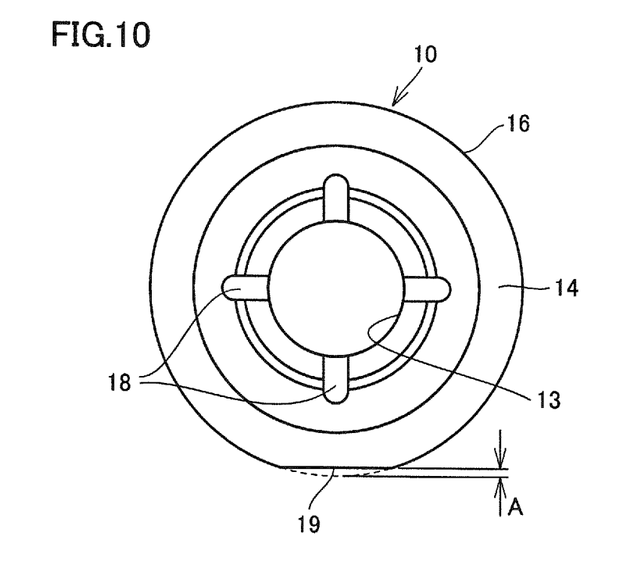
FIG. 10 is a plan view showing another example of the cutting insert.
Figure 11A:
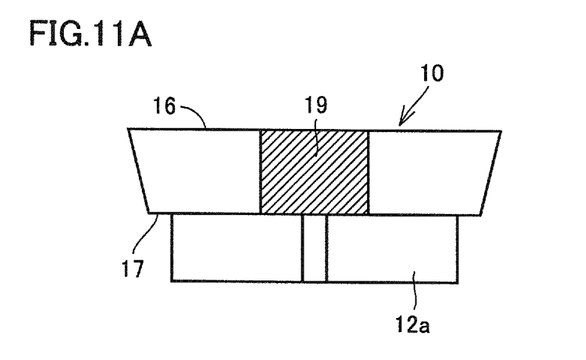
FIG. 11A is a side view of the cutting insert in FIG. 10.
Figure 11B:
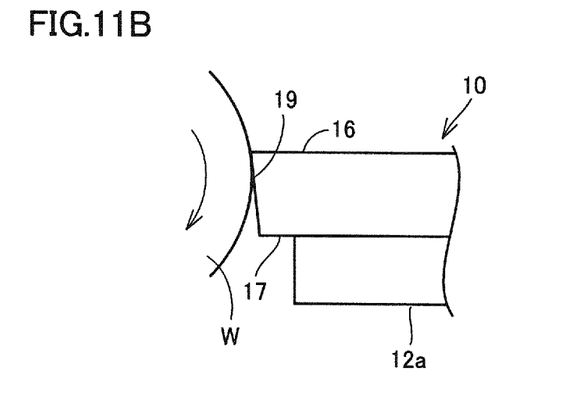
FIG. 11B is a diagram showing a portion in which the cutting insert in FIG. 11A and a workpiece come into contact with each other in the case where the lathe turning tool having the cutting insert is used.
Figure 12:
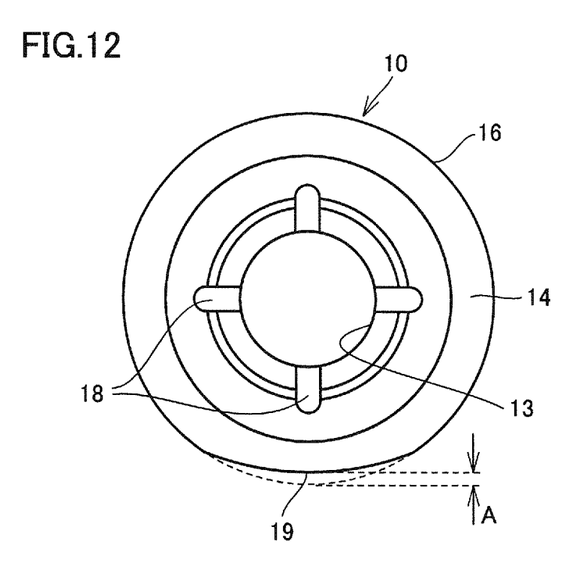
FIG. 12 is a plan view showing still another example of the cutting insert.
Figure 13:
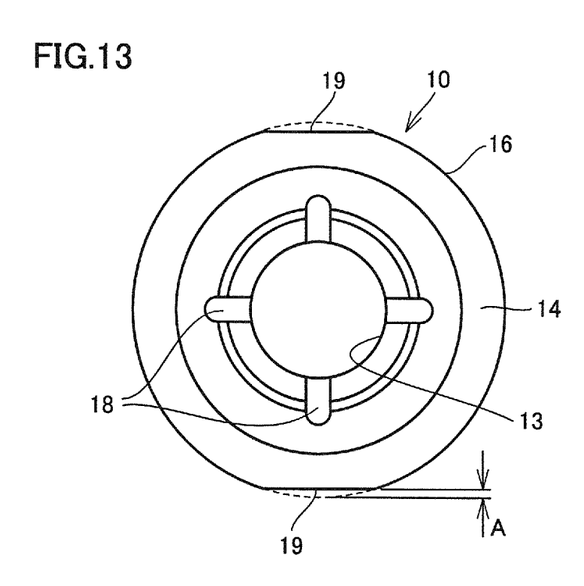
FIG. 13 is a plan view showing still another example of the cutting insert.
Figure 14A:
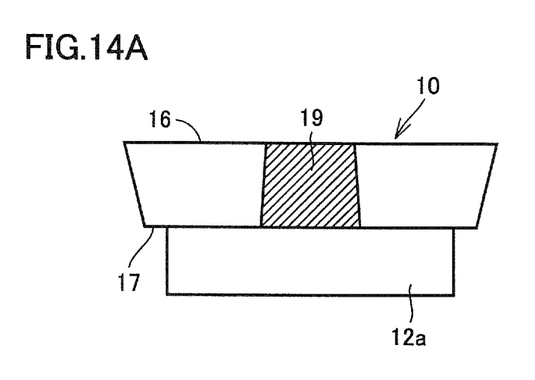
FIG. 14A is a side view showing still another example of the cutting insert.
Figure 14B:
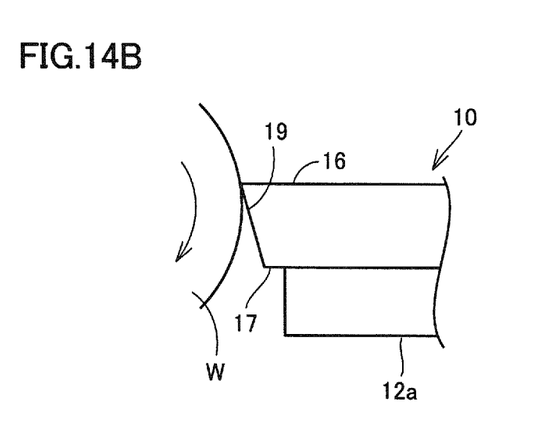
FIG. 14B is a diagram showing a portion in which the cutting insert in FIG. 14A and the workpiece come into contact with each other in the case where the lathe turning tool having the cutting insert is used.

In addition, although cutting insert 10 employed for the exemplified tool is configured to have a shape obtained by rounding off each corner of a basic hexadecagonal shape, the cutting insert to be used may include a cutting edge having a shape, as seen from the axial end face, including: a circular shape or a polygonal shape having eight or more corners; a shape obtained by rounding off the corners of a basic polygonal shape having eight or more corners; a shape continuously extending in an endless manner while regularly undulating in the radial direction; or a circular shape in which a deformed portion 19 is partially formed. As shown in FIGS. 10 and 11A, cutting edge 16 has a shape, as seen from the axial end face, that includes at least one or more deformed portions 19 formed in the outer circumferential portion. Deformed portion 19 as seen from the axial end face is formed in a linear shape. In this case, it is preferable that a difference A between the radius of the circumscribed circle as seen from the axial end face and the distance from the center of the circumscribed circle to deformed portion 19 is 0.2 mm or more and 0.4 mm or less. From a different viewpoint, it is preferable that a retreat amount A in deformed portion 19 in the radial direction of cutting edge 16 caused by formation of deformed portion 19 in the arc of cutting edge 16 (see FIG. 10) is 0.2 mm or more and 0.4 mm or less. In this way, the thickness of each chip can be locally decreased, so that each chip can be readily cut off. For example, in the case where retreat amount A (see FIG. 10) is set to be less than 0.2 mm, the effect of cutting off chips is reduced. On the other hand, in the case where retreat amount A (see FIG. 10) is set to be more than 0.4 mm, the roughness of the processed surface of the workpiece and the influence on the vibration during processing are increased. Referring to FIG. 12, the above-described deformed portion 19 may be formed so as to be depressed on the center side of the circumscribed circle of cutting edge 16 as seen from the axial end face. Also in this way, the thickness of each chip can be locally decreased, so that each chip can be readily cut off. Also as shown in FIG. 14A, the relief angle of the portion forming a flank face in deformed portion 19 (diagonally shaded area) described above may be set to be larger than those of other portions. In the above-described deformed portion 19, since the flank face is flat so that the end tends to be readily worn, it is important to set the relief angle to be relatively large for improving the wear resistance. As can be seen from FIGS. 11A, 11B, 14A, and 14B, when making a comparison in terms of the same cutting depth, the portion in which the flank face and the workpiece come in contact with each other is greater in length and contact area in the case of the insert having a smaller relief angle as shown in FIG. 11B. In contrast to this, the insert having a relatively larger relief angle as shown in FIG. 14B can be decreased in contact area, and therefore, is hard to be worn. Furthermore, deformed portion 19 is less in cutting depth than other portions, and therefore, is less influenced by reduced strength resulting from the increased relief angle. According to this, it is preferable that the relief angle of the deformed portion is set at 5° or more and 20° or less. Furthermore, as shown in FIG. 13, the above-described deformed portion 19 may be formed, for example, in two positions in cutting edge 16 as seen from the axial end face. In the example in FIG. 13, deformed portions 19 are provided so as to face each other across the center as seen from the axial end face. Also in this configuration, chips can be locally reduced in thickness, and thus, can be readily cut off. In addition, it is preferable that the above-described deformed portion 19 is provided in the vicinity of the corner portion of second portion 12 for the purpose of ensuring rigidity of the tool. The cutting insert provided with these deformed portions 19 as described above is particularly suitable to process a material such as low-carbon steel from which chips are hard to be cut off and thereby readily causing a problem with chip processing performance. The processing carried out using the lathe turning tool as described in the present application is characterized in that the tool feed rate per rotation of a workpiece (which will be hereinafter referred to as a feed rate) can be increased, but the thickness of each chip is increased by that amount. Furthermore, since an insert having a circular shape is used for processing, chips in this case are greater in width and strength than chips produced in the commonly performed cutting processing. Accordingly, in the case of the cutting insert having these deformed portions 19 as described above, chips can be decreased in thickness or width, than usual, periodically in accordance with rotation of the tool. In the portion where the shape of each chip is changed in this way, stress concentration tends to readily occur and the strength of the chip itself becomes weakened, with the result that the chip can be readily cut off.

Furthermore, it is conceivable that the shape of the cutting edge of deformed portion 19 described above is formed in a linear shape, a concave shape, or a convex shape as seen from the axial end face. However, in deformed portion 19 described above, the relief effect for the processed surface tends to be decreased at its both ends, and this tendency is increased particularly in the case of the concave shape, with the result that the wear amount tends to increase at both ends. Therefore, it is further more preferable that deformed portion 19 is formed in a linear shape or in a convex R shape having a radius of curvature that is larger than the radius of the circle of the cutting edge.

EXAMPLE

As shown in FIG. 10, a review has been made with regard to the influence of retreat amount A in the tool provided with deformed portion 19 in which a part of the cutting edge was formed close to the center relative to the circumscribed circle. Specifically, six types of tools including prototype products 1 to 6 having different retreat amounts A were prepared to measure the maximum length of each chip and the average vibration (acceleration) amplitude in the vicinity of the tool attachment portion at the time when carbon steel was cut using each tool. As each prototype product, an insert provided with a cutting edge of a true circle having a diameter of 16 mm except for deformed portion 19 was used. Furthermore, in each of prototype products 2 to 6, deformed portion 19 was formed in a linear shape, and retreat amount A from the true circle was set at 0.1 mm or more and 0.5 mm or less. Other configurations are the same as those in FIGS. 1 to 7, in which the first portion has a thickness of 3.5 mm; the second portion has a thickness of 3 mm; and the square part of the second portion has a side of 9 mm. Furthermore, the insert is made of a PVD (Physical Vapor Deposition) coated cemented carbide (JIS K20).

In the cutting evaluation, carbon steel S25C having a diameter of 70 mm was used as a workpiece, and the cutting conditions were as follows: cutting speed at 200 m/min; feed rate at 2.0 mm/rev; cut by 1 mm; Wet; and tool rotation speed to be the same as the workpiece rotation speed (909 $min^{-1}$).

(Evaluation)

Six types of tools including prototype products 1 to 6 mentioned above were prepared to measure the length of each chip and the average vibration (acceleration) amplitude in the vicinity of the tool attachment portion at the time when carbon steel S25C was cut using each tool.

(Results)

The results are shown in Table 1.

TABLE 1

| Tool | Cutting Edge Retreat Amount A mm | State of Tool Main Body | Length of Chip mm | Vibration Amplitude $m/s^2$ |
|---|---|---|---|---|
| Prototype Product 1 | 0 | No damage | Not cut off | 0.10 |
| Prototype Product 2 | 0.1 | No damage | Not cut off | 0.11 |
| Prototype Product 3 | 0.2 | No damage | 100 to 200 | 0.13 |
| Prototype Product 4 | 0.3 | No damage | 70 to 150 | 0.17 |
| Prototype Product 5 | 0.4 | No damage | 30 to 100 | 0.23 |
| Prototype Product 6 | 0.5 | No damage | 20 to 60 | 0.45 |

As apparent from Table 1, the larger the retreat amount A is, the shorter the length of each chip is; but when retreat amount A is increased, the almost intermittently cut state occurs in the same portion, thereby showing a tendency that the vibration becomes larger. As to the chip length, when retreat amount A becomes 0.2 mm or more, the chip is cut off and reduced in length. On the other hand, it is shown that vibration suddenly becomes larger when retreat amount A is 0.5 mm or more. It is considered from these results that the retreat amount falling within a range of 0.2 mm or more and 0.4 mm or less is suitable since it is excellent in balance between the chip processing performance and vibration.

Furthermore, although cutting insert 10 as shown is formed in a positive type having a cutting edge set at an acute angle, cutting insert 10 used for the tool of the present invention may be formed in a negative type having a cutting edge set at a right angle.

REFERENCE SIGNS LIST 1 tool main body, 2 clamp screw, 3 insert attachment portion, 4 bearing surface, 5 concave portion, 5a restraining surface, 6 screw hole, 6a reinforcing member, 7 relief portion, 8 fluid channel, 9 gap, 10 cutting insert, 11 first portion, 12 second portion, 12a side surface of second portion, 13 attachment hole, 14 rake face, 15 flank face, 16 cutting edge, 17 face that faces insert attachment portion, 18 groove, 19 deformed portion, w2 width of side surface of second portion, w1 width of restraining surface, C center line, W workpiece.

The invention claimed is:

1. A lathe turning tool comprising: a tool main body; and a cutting insert attached to an insert attachment portion at an end of said tool main body, said lathe turning tool processing a workpiece with a cutting edge of said cutting insert while rotating said tool main body and said cutting insert about a center line of the tool as an axis, said cutting edge extending continuously in a tool rotating direction, said cutting insert including a first portion related to cutting and a second portion used for positioning, said first portion having a rake face disposed at said end of the tool, a flank face disposed on an outer circumference of the tool, a cutting edge having a circular shape or an approximately circular shape as seen from an axial end face, and a face facing the insert attachment portion at the end of said tool main body, and said second portion having side surfaces including at least one flat plane that is parallel to said center line of the tool or inclined at a prescribed angle to said center line of the tool, said second portion extending continuously to a region surrounded by the face of said first portion that faces the insert attachment portion at the end of said tool main body, and said second portion being fitted into the tool main body to position the cutting insert and to prevent the cutting insert from rotating, wherein a concave portion into which said second portion of said cutting insert is fitted is provided by providing an opening at said end of said tool main body, said concave portion has a restraining surface provided to correspond to each side surface of said second portion, said restraining surface is a flat plane and has a width narrower than a width of a flat plane in the side surface of said second portion, and the flat plane in the side surface of the second portion comes into contact with one end of said restraining surface when said second portion rotates within said concave portion.

2. The lathe turning tool according to claim 1, wherein said tool main body has a supporting surface extending continuously in a circumferential direction and perpendicularly to an axis around a portion fitted to said second portion of the cutting insert such that said supporting surface supports a face of the cutting insert that faces the insert attachment portion at the end of said tool main body.

3. The lathe turning tool according to claim 1, wherein said cutting insert is provided in a center portion with an attachment hole through which a clamp screw passes, and further provided in said rake face with a plurality of grooves extending in a radial manner from an inner surface of said attachment hole in a radially outward direction, a flow path of a fluid is formed by each of said grooves between the clamp screw passing through said attachment hole and the cutting insert, and a gap allowing communication between said flow path and a fluid channel formed inside said tool main body is provided between said tool main body and the cutting insert.

4. The lathe turning tool according to claim 1, wherein assuming that an axial dimension of said second portion of said cutting insert is defined as L, said axial dimension of said first portion is set to fall within a range of 0.8 L to 1.3 L.

5. A cutting insert used for the lathe turning tool according to claim 1, wherein said cutting insert includes said first portion related to cutting and said second portion used for positioning, said first portion has said rake face disposed at said end of the tool, said flank face disposed on the outer circumference of the tool, said cutting edge having the circular shape or the approximately circular shape as seen from said axial end face, and the face received and supported by the insert attachment portion at the end of said tool main body, and said second portion has a regular polygonal cross section perpendicular to an axis, and has a side surface parallel to said center line of the tool.

6. The cutting insert according to claim 5, wherein the circular shape or the approximately circular shape of said cutting edge includes any one of: a polygonal shape having eight or more corners; and a shape obtained by rounding off corners of a basic polygonal shape having eight or more corners.

7. The cutting insert according to claim 5, wherein said cutting edge has a shape, as seen from said axial end face, including at least one deformed portion in which a cutting edge is located in a position where a distance from a center of a circumscribed circle as seen from said axial end face is shorter than a radius of said circumscribed circle.

8. The cutting insert according to claim 7, wherein said deformed portion as seen from said axial end face is formed in a linear shape or in an arc shape having a radius of curvature larger than a radius of curvature of said circumscribed circle.

9. The cutting insert according to claim 7, wherein a distance difference between a distance from the center of said circumscribed circle to the cutting edge of said deformed portion and the radius of curvature of said circumscribed circle is 0.2 mm or more and 0.4 mm or less.

* * * * *